United States Patent [19]
Mintz et al.

[11] Patent Number: 5,915,013
[45] Date of Patent: Jun. 22, 1999

[54] METHOD AND SYSTEM FOR ACHIEVING ROUTING OF SIGNALLING INFORMATION

[75] Inventors: Donald Jay Mintz, Fair Haven; Mark A. Ratcliffe, Oakhurst, both of N.J.

[73] Assignee: AT&T Corp, Middletown, N.J.

[21] Appl. No.: 08/794,960

[22] Filed: Feb. 4, 1997

[51] Int. Cl.⁶ .................................................. H04M 3/42
[52] U.S. Cl. .................... 379/230; 379/207; 379/221; 370/217; 370/236
[58] Field of Search ........................ 379/219, 220, 379/221, 229, 230; 370/216, 217, 218, 219, 225, 226, 227, 228, 229, 236, 237, 235

[56] References Cited

U.S. PATENT DOCUMENTS

| | | | |
|---|---|---|---|
| 5,481,603 | 1/1996 | Gutierrez et al. | 379/221 |
| 5,592,466 | 1/1997 | Buczny et al. | 370/217 |
| 5,642,396 | 6/1997 | Cowgill | 379/14 |
| 5,771,282 | 6/1998 | Friedes | 379/121 |

Primary Examiner—Scott Wolinsky

[57] ABSTRACT

A method and system for processing a call in a telecommunications network comprising a signalling system interconnecting a switch, a segmentation directory and at least one service processor for processing a call associated with a particular service or feature provided by the telecommunications network. The switch receives the call and information associated with the call and transmits a first query message to the segmentation directory. The segmentation directory determines whether the call requires processing by a service processor, and if so, identifies a service processor capable of processing the call. The segmentation directory also determines whether a second query message may be transmitted from the segmentation directory to the identified service processor over the signalling system and, if the second query message cannot be transmitted from the segmentation directory to the identified service processor, the segmentation directory transmits a response message to the switch instructing the switch to transmit a third query message over the signalling system to the identified service processor.

29 Claims, 6 Drawing Sheets

METHOD AND SYSTEM FOR ACHIEVING ROUTING OF SIGNALLING INFORMATION

BACKGROUND OF THE INVENTION

1. Field of the Invention

The present invention relates generally to the field of telecommunications and, more particularly, to a method and system for instructing a network element to query an application processor in a telecommunications network.

2. Description of the Related Art

With the development of complex telecommunications networks, such as AT&T's public switched telephone network (PSTN), there continues to be a growing demand for customized call treatment that provides subscribers with a variety of "featured" services through the telecommunications network on calls to general destination numbers. These "featured" services may include, but are not limited to, "800" service processing, customized billing, call forwarding, answering services, voice messaging, automatic call back, etc.

Since the computer processing switches that route calls within the telecommunications network typically lack sufficient capability to process these customized services, separate service processors, such as a Network Control Point (NCP), have been incorporated into the network to assist in providing switch service features and capabilities. The service logic and customer records necessary for processing these customized features reside primarily in the service processors interfacing with the network.

Currently, a network element, such as a Segmentation Directory (SD), is frequently utilized to direct telephone calls to the appropriate service processor, The SD is essentially a large network database containing records relating to the identity and network address of one or more service processors that are capable of processing the call in accordance with the particular services subscribed to by the subscriber. The SD may be a discrete network element or may be incorporated within another network element such as a Signal Transfer Point (STP). Communication or signalling, between the switch, SD and service processor are commonly performed over a signalling network, such as the Common Channel Signalling, System No. 7 (SS7), which interconnects the various components of the telecommunications network.

In such telecommunications systems, however, it is possible that, under certain unavoidable failure conditions, a call over the network will be unable to be processed or otherwise lost. These unavoidable failure conditions include: (1) when the SD does not have an available SS7 network route to the appropriate service processor; (2) during conditions of SS7 network route congestion to the service processor; or (3) when the switch is required to utilize the switch's backup signalling routing function known as Alternate Signalling Transport Network (ASTN).

SUMMARY OF THE INVENTION

It is therefore desirable to improve network reliability by preventing calls from being lost under these unavoidable failure conditions. The foregoing and other objects and advantages are achieved in accordance with the present invention through the provision of a method and system for processing a call in a telecommunications network comprising a signalling system interconnecting a switch, a segmentation directory and at least one service processor for processing a call associated with a particular service or feature provided by the telecommunications network. The switch receives the call and information associated with the call and transmits a first query message to the segmentation directory. The segmentation directory determines whether the call requires processing by a service processor, and if so, identifies a service processor capable of processing the call. The segmentation directory also determines whether a second query message may be transmitted from the segmentation directory to the identified service processor over the signalling system and, if the second query message cannot be transmitted from the segmentation directory to the identified service processor, the segmentation directory transmits a response message to the switch instructing the switch to transmit a third query message over the signalling system to the identified service processor.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in connection with the accompanying drawings wherein.

DESCRIPTION OF THE PREFERRED EMBODIMENTS

Figure 1:
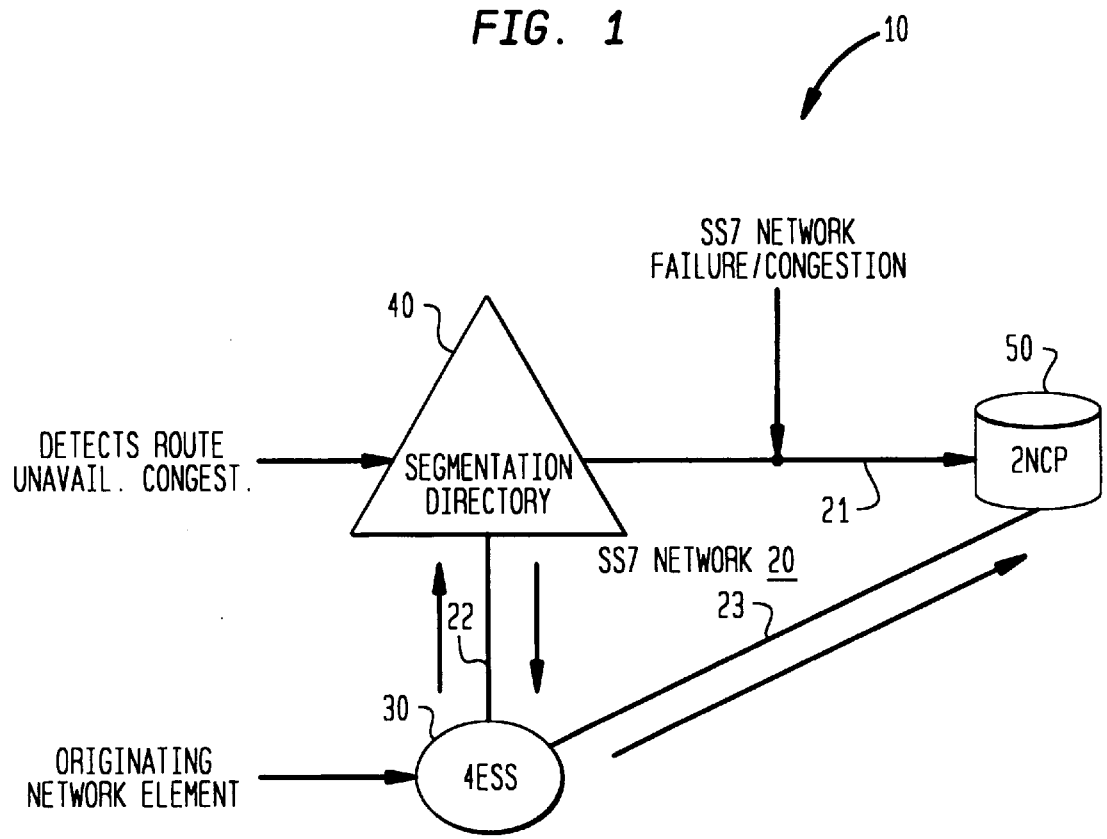
FIG. 1 is a schematic illustrating signalling over a signalling system in a telecommunications network in accordance with the present invention where an SS7 network route is unavailable to the service processor.

Referring to FIG. 1, there is illustrated a signalling system 20 in a telecommunications network 10, such as the PSTN, in accordance with the present invention. The signalling system 20, such as the Common Channel Signalling System No. 7 (SS7) signalling system, interconnects the various components of the network 10, including a switch 30, Segmentation Directory (SD) 40 and service processor 50. It is understood that the SD 40 may be a discrete network element or may be incorporated within another network element, such as a Signal Transfer Point (STP).

As is illustrated in FIG. 1, SD 40 is connected to service processor 50 by data link 21; the switch 30 is connected to the SD 40 by data link 22; and the switch is connected to the service processor 50 by data link 23. It is understood that the data links in the signalling system 20 are logical links, although the data links could be physical links. The signalling system 20 could in reality be an SS7 network of interconnected STPs through which network elements 30, 40 and 50 communicate.

Figure 2:
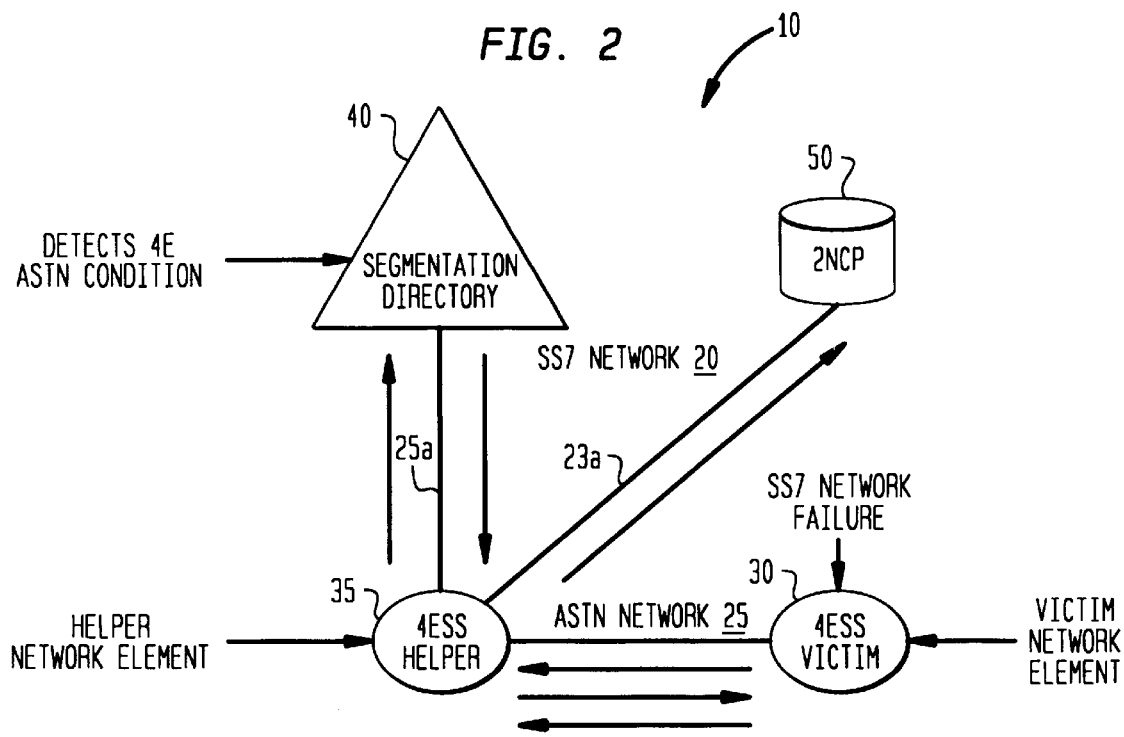
FIG. 2 is a schematic illustrating signalling over a signalling system in a telecommunications network in accordance with the present invention where the network switch is required to utilize ASTN routing.

In the embodiments illustrated in FIGS. 1 and 2, the switch 30 is illustratively a 4ESS® switch commercially available from Lucent Technologies Inc., but could be any of any number of conventional switches capable of processing a call over the network 10 and processing signalling messages over signalling system 20. Similarly, the service processor 40 is illustratively shown as and may be implemented using a 2NCP processor also available from Lucent Technologies Inc., but could otherwise be any processing means capable of processing signalling messages communicated over the signalling system 20. The service processor 50 is utilized to implement one or more network services and operates to control a call associated with a network subscriber who subscribes to the particular services implemented by that service processor 50.

While only one switch 30, SD 40 and service processor 50 are illustrated in FIG. 1 (and two switches 30 and 35 are illustrated in FIG. 2), it is understood that the telecommunications network 10 may include multiple switches, SDs and/or service processors to process and complete calls over the network 10. It is also understood that various trunks and other channels may be provided in the network 10 to connect, for instance, two or more switches to one another. It is further understood that various modifications may be made to the network 10 without departing from the scope of the invention. Furthermore, while the present invention will be described hereinafter with respect to "SS7" messaging over the signalling system 20, it is understood that other types of signalling systems may be utilized to interconnect and communicate signalling messages between the various components of the network 10.

During the normal operation of the network 10, a call will be directed to the switch 30 for processing. The switch 30 will then transmit at least an SS7 message to the SD 40 over data link 22 to identify whether the call is one having network service "features" requiring processing by a service processor 50. The term "features" or "featured call" as used herein is intended to refer to a call that requires a service processor 50 to provide processing for the call (thereby requiring a query (SPQuery) message to be communicated to the service processor). One example of a "featured call" may be, but is not intended to be limited to, a call requiring "800" service processing.

If the SD 40 determines that the call requires special processing by a service processor 50, then SD 40 searches its database to identify one or more service processors 50 that are capable of processing the call for the particular network service subscribed to by the subscriber. Upon identifying the appropriate service processor 50, the SD 40 transmits at least an SS7 message over data link 21 to the appropriate service processor 50 for further processing of the call. However, as is illustrated in FIG. 1, circumstances may arise where the SD 40 is temporarily unable to communicate with the desired service processor 50 over data link 21 (e.g., due to SS7 network route unavailability or congestion).

Referring to FIG. 1, a call is routed to the switch 30, which switch creates a query message (SDQuery) to the SD 40. The SDQuery message is preferably an SD TCAP query message. The switch 30 determines the SD 40 to which the SDQuery is to be sent via an SD routing table stored in a database of the switch 30 and the switch 30 then transmits the SD query to the appropriate SD 40 over data link 22.

Figure 6:
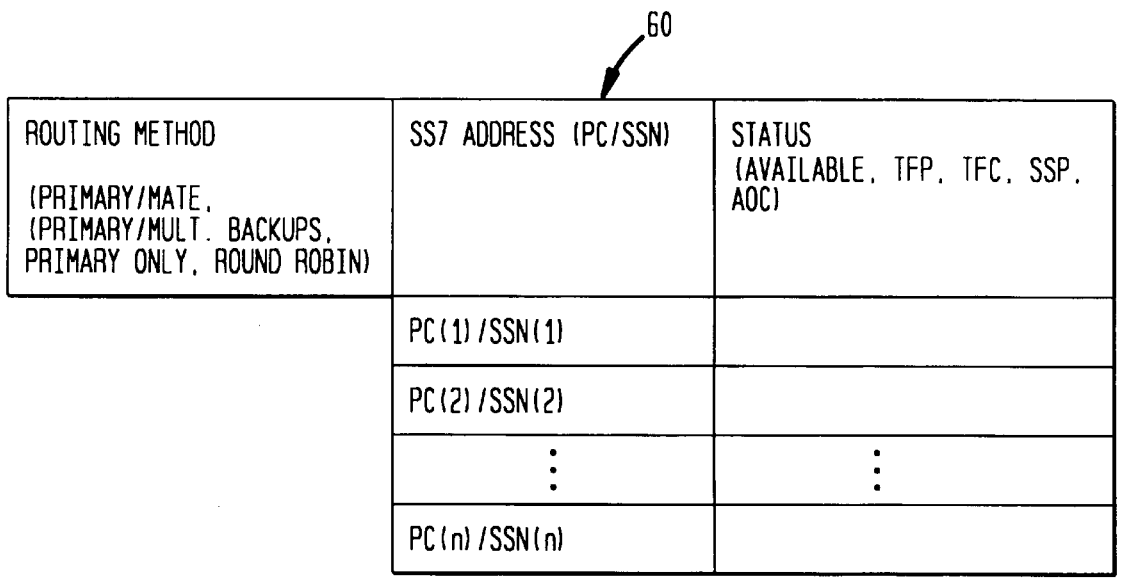
FIG. 6 illustrates a table utilized by the SD to determine the service processor's SS7 network routing information for a call in accordance with the present invention.

The SD 40 receives and processes the SDQuery message and determines if the call is a "featured" call requiring special service processing by a service processor 50. If such special service features are required for the call, the SD 40 then searches an SP Table 60 in its database to identify one or more service processors 50 (including any backup or secondary service processors) that are capable of processing the call for the particular network service subscribed to by the subscriber. The SP Table 60, which is illustrated in FIG. 6 and described further below, contains information on service processor point codes, routing type (e.g., round robin routing, primary/mate routing, primary only, and primary and multiple backups) and availability status of service processors 50 in the network 10 that are capable of processing the call.

Once the appropriate service processor(s) 50 is identified by the SD 40, the SD 40 retrieves from the SP Table 60 the SS7 network address (e.g., the point code and subsystem number) of the desired service processor 50, as well as the SS7 network address of any backup or secondary service processors capable of processing the call in the event that the desired service processor is unavailable or cannot be communicated with.

Under normal conditions, the SD 40 attempts to route a query (SPQuery) message to the appropriate service processor 50 capable of processing those special service features associated with the call. However, if one of the following failure conditions regarding the desired service processor 50 (and/or the identified backup or secondary service processors) is true, the SD 40 instead prepares a "Query" instruction as part of its response (SDResponse) message to the switch 30, which "Query" instruction requests the switch 30 to send a query (SPQuery) message to the desired service processor 50 via the SS7 interface (data link 23):

- The service processor 50 and all backup or secondary service processors are SS7 Message Transfer Part (MTP) route inaccessible (e.g., the data link 21, signalling interfaces or SS7 signalling routes have failed between the SD 40 and the service processor 50 (and any backup or secondary service processors)).
- One or more service processors 50 capable of processing the call are MTP route inaccessible and the remaining service processors 50 capable of processing the call are SS7 Signalling Connection Control Part (SCCP) Subsystem Prohibited (SSP) (e.g., a failure has occurred within the service processor 50).
- The available service processor 50 identified by the SD 40 is MTP route congested (e.g., the route (data link 21) is in an overload condition receiving more traffic than it is capable of handling and preventing proper signalling between the SD 40 and the service processor 50).

The SDResponse message is preferably an SD TCAP response message. As part of the "Query" instruction of the SDResponse message prepared by the SD 40, the SD 40 includes the MTP route inaccessible point codes and/or MTP route congested point codes for forwarding to the switch 30. In addition, the SD 40 also includes as part of the SDResponse message the TCAP information (instructions and associated parameters) to be placed into the SS7 message (SP query message) that will be subsequently transmitted by the switch 30 to the service processor 50. The SDResponse message prepared by the SD 40 and containing the "Query" instruction is transmitted to the switch 30 over data link 22.

The switch 30 receives and processes the SDResponse message from the SD 40. Based on the instruction by the SD 40 to query the service processor 50, the switch 30 attempts to create a query (SPQuery) message to the service processor 50 using the instructions placed in the SDResponse message received from the SD 40. The SPQuery message is preferably an SP TCAP query message. The SS7 address of the service processor 50 (SP SS7 addressed) used to send the SPQuery message is the first address in the list of SP SS7 addresses sent from the SD 40. If the first address is MTP route unavailable or SCCP subsystem prohibited, the switch 30 attempts to use the next SP SS7 address in the list (associated with another service processor identified by the SD 40 as being capable of processing the call based upon the particular services subscribed to by the subscriber) until the switch 30 finds an accessible address for an appropriate service processor 50. If no SP SS7 address is accessible to a service processor 50, then the switch 30 will default route the call (e.g., attempt to route and process the call based upon the information (e.g., dialed number, trunk information, etc.) available in the switch 30).

Alternatively, as is illustrated in FIG. 1, if the SP SS7 address is available to an appropriate service processor 50, the switch 30 transmits a SPQuery message to that service processor 50 over data link 23. The service processor 50 thereafter receives and processes the SPQuery message and provides the required application processing for the call. The communication may thereafter continue between the switch 30 and the service processor 50 in accordance with the particular service provider-defined processing associated with that network service application.

If the desired service processor 50 is not available, the switch 30 attempts to route the call in the network 10 using the information available in the switch 30.

FIG. 2 is similar to FIG. 1, but illustrates the case where the switch 30 is using the ASTN interface to route the SDQuery to the SD 40. In the ASTN network architecture for the call, the switch 30 (referred to as the "victim switch") has experienced a failure of its SS7 signalling interface (e.g., the normal signalling interface to send SS7 messages) over signalling network 20. Upon experiencing this failure, the victim switch 30 utilizes its backup signalling network interface (ASTN), which comprises a helper switch 35 (e.g., a switch having an available SS7 interface and direct ASTN signalling link(s) to the victim switch 30) that allows the victim switch 30 send/receive SS7 messages.

In FIG. 2, the victim switch creates a query (SDQuery) message to the SD 40, which SDQuery message will be used by the SD 40 to determine if the call shall have special call handling "features" applied to it. The victim switch 30 determines that its SS7 interface has failed. Accordingly, the victim switch 30 sets the ASTN indicator in the SDQuery message to "yes" and uses its backup signalling (ASTN) interface to send the SDQuery message to the SD 40. The ASTN indicator may be a TCAP parameter in the SDQuery message that indicates the signalling interface method that the victim switch 30 is using to query the SD 40. That is, this TCAP parameter indicates whether the victim switch 30 is using its SS7 or ASTN interface. Under ASTN routing, the victim switch 30 identifies a "helper" switch 35 that may be utilized to route the SDQuery message to the SD 40.

The victim switch 30 transmits the SDQuery message to the identified helper switch 35 over ASTN data link 25. The helper switch 35 receives the SDQuery message and identifies the appropriate SD 40 upon which the SDQuery should be transmitted using an SD routing table stored within a database of the helper switch 35. In step 2, the helper switch 35 transmits the SDQuery message to the identified SD 40 over data link 25a of the SS7 signalling system 20.

In FIG. 2, the SD 40 receives and processes the SDQuery from the helper switch 35 in order to process the SDQuery message and determine whether the call is a "featured" call requiring a service processor 50. If such special service features are required for the call, the SD 40 then searches the SP Table 60, which is illustrated in FIG. 6 and described further below, stored in its database to identify one or more service processors 50 (including any backup or secondary service processors) that are capable of processing the call for the particular network service subscribed to by the subscriber. Once the appropriate service processor(s) 50 is identified by the SD 40, the SD 40 retrieves from the SP Table 60 the SS7 network address (e.g., the point code and subsystem number) of the desired service processor 50, as well as the SS7 network address of any backup or secondary service processors capable of processing the call in the event that the desired service processor is unavailable or cannot be communicated with.

Using the ASTN indicator in the SDQuery message, the SD 40 identifies that the victim switch 30 originating the SDQuery message is in an ASTN condition (e.g., the ASTN indicator was set to "yes" by the victim switch 30). The SD 40 therefore creates a "Query" instruction as part of its SDResponse message to the victim switch 30. As part of the "Query" instruction of the SDResponse message prepared by the SD 40, the SD 40 includes the MTP point codes of the appropriate service processor 50 (and any backup or secondary service processors) for forwarding to the victim switch 30. In addition, the SD 40 also includes as part of the SDResponse message the TCAP information (instructions and associated parameters) to be placed into the SS7 message (SPQuery message) that will be subsequently transmitted to the service processor 50.

In FIG. 2, the SDResponse message prepared by the SD 40 and containing the "Query" instruction is transmitted to the helper switch 35 over data link 25a. The helper switch 35 receives the SDResponse message from SD 40 and, based on the transaction ID of the message, the helper switch 35 determines that the received SDResponse message is intended for the victim switch 30. The helper switch 35 transmits the SDResponse message to the victim switch 30 over data link 25 of the SS7 signalling system 20.

The victim switch 30 in FIG. 2 receives and processes the SDResponse message. Based upon the instruction within the SDResponse message to "Query" the service processor 50, the victim switch 30 attempts to create an SPQuery message to the service processor 50 using the service processor instructions contained in the SDResponse message. The SP SS7 address used to send the SPQuery message corresponds to the first address in the list of SP SS7 addresses received from the SD 40. If the SS7 interface of the victim switch 30 becomes available but no SP SS7 address is accessible, the victim switch 30 will default route the call (e.g., attempt to route and process the call based upon the information (dialed number, trunk information, etc.) available in the victim switch 30).

If the SP SS7 address is available or the victim switch 30 continues to be in the ASTN condition, the victim switch 30 transmits the SPQuery message to the helper switch 35 over ASTN data link 25. The helper switch 35 receives the SPQuery message over the ASTN data link 25 and creates the SPQuery message to the SP SS7 address corresponding to the desired service processor 50.

The helper switch 35 thereafter transmits the SPQuery message to the desired service processor 50 over data link 23a of the SS7 signalling network.

The service processor 50 thereafter receives and processes the SPQuery message and provides the required application processing for the call. The communication may thereafter continue between the victim switch 30, the helper switch 35 and the service processor 50 in accordance with the particular service provider-defined processing associated with that network service application.

Figure 3:
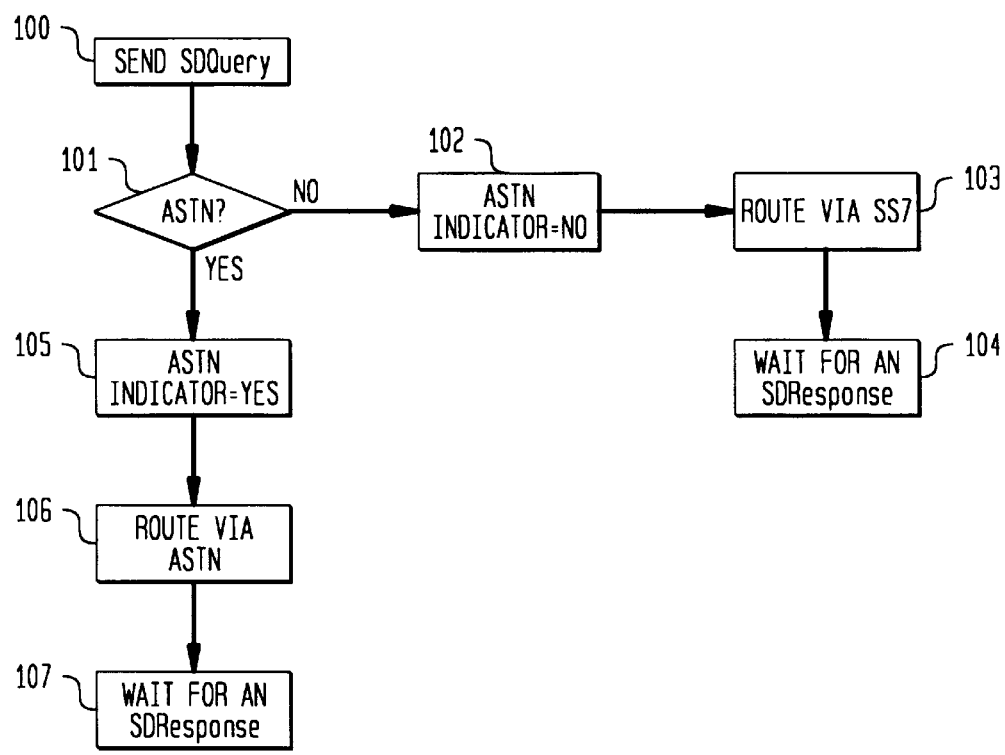
FIG. 3 is a flow chart illustrating the method in which the network switch communicates information to the SD in accordance with the present invention.

Referring to FIG. 3, a flow chart is illustrated showing how the victim switch 30 provides some of the information (e.g., the ASTN indicator) used by the SD 40 to determine if the "Query" instruction will be transmitted to victim switch 30 due to the ASTN status of the victim switch 30. As discussed above, the ASTN indicator is a TCAP parameter in the SDQuery message that indicates whether the victim switch 30 is using its SS7 or ASTN interface.

In step 100 illustrated in FIG. 3, the victim switch 30 has created the SDQuery message to be transmitted to the SD 40. In step 101, the victim switch 30 determines whether its SS7 interface to the SD 40 is operable and available, or whether the victim switch 30 must utilize its ASTN interface. If the victim switch's SS7 interface is available, then the switch 30 sets the ASTN indicator to "No" (step 102) and routes the SDQuery message to the SD 40 via the SS7 signalling network 20 (step 103). The victim switch 30 then "waits" for an SDResponse message from SD 40 and, if the call is a "featured" call, from service processor 50 providing the switch 30 with instructions on routing/processing of the call (step 104).

However, if the victim switch 30 is required to utilize its ASTN interface, then the victim switch 30 sets the ASTN indicator to "Yes" (Step 105) and transmits the SDQuery message to the SD 40 using the helper switch 35 in accordance with the ASTN interface (step 106). Thereafter, the victim switch 30 then "waits" for an SDResponse message from either the service processor 50 or SD 40 and, if the call is a "featured" call, from service processor 50 providing the switch 30 with instructions on routing/processing of the call (step 107).

Figure 4:
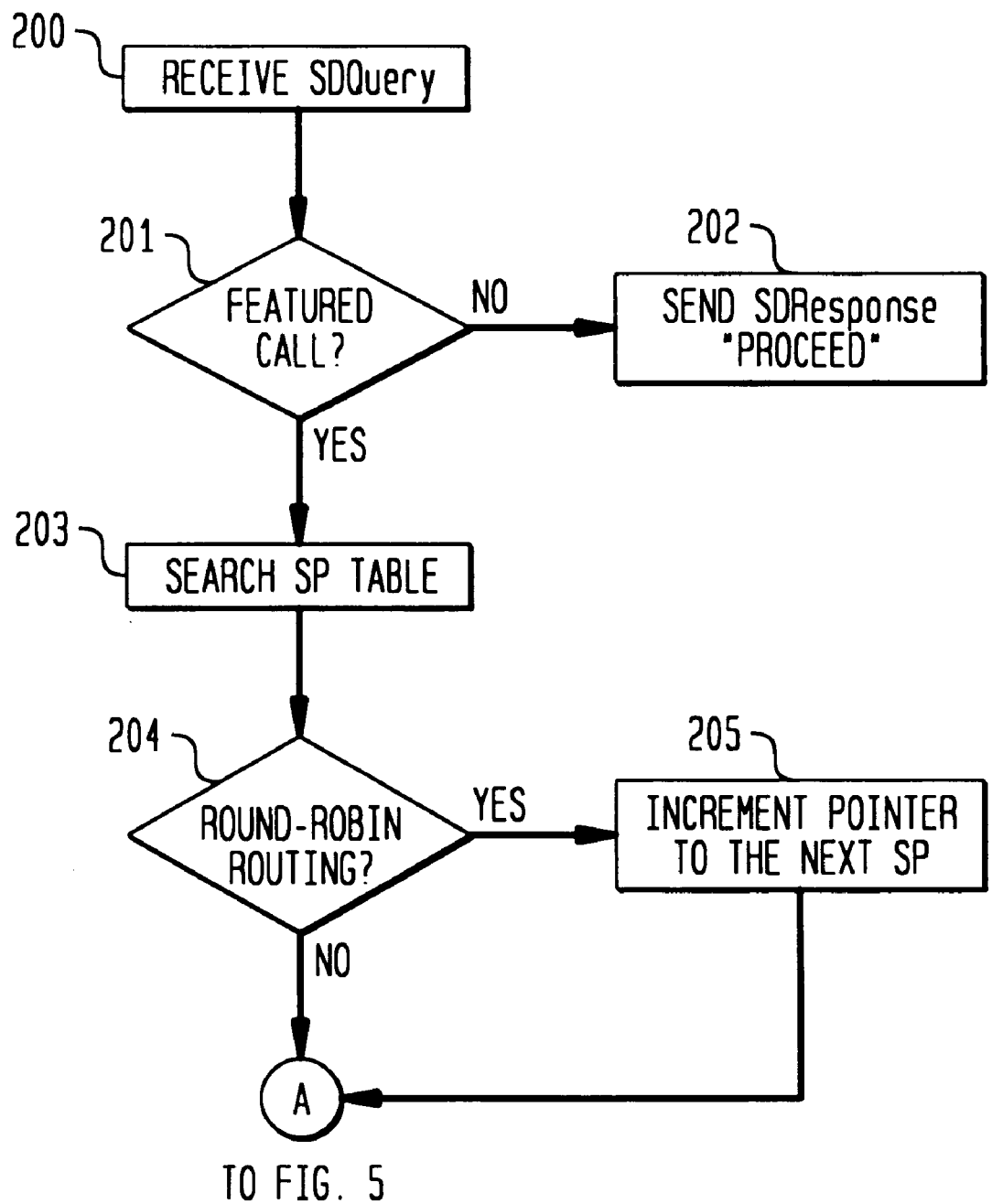
FIG. 4 is a flow chart illustrating the method in which the SD processes the information received from the switch in accordance with the present invention.

FIG. 4 is a flow chart illustrating the method in which the SD 40 processes the information (e.g., the SDQuery message) received from the switch 30 (either directly over the SS7 interface or indirectly via the ASTN interface) in accordance with the present invention. In step 200 illustrated in FIG. 4, the SD 40 receives the SDQuery message transmitted from the switch 30 either directly over the SS7 interface or indirectly via the ASTN interface. Upon receiving the SDQuery message, the SD 40 then determines whether the call is a "featured" call requiring a service processor 50 to provide special service processing for the call or a "non-featured" call where a service processor is not required to process the call (step 201).

If the SD 40 determines that the call is a "non-featured" call that does not require special processing by a service processor 50, then the SD 40 creates and transmits to the switch 30 an SDResponse "Proceed" message instructing the switch 30 to proceed with call processing using the information in the call registers of the switch 30 to route the call within the network 10 (step 202).

However, if the SD 40 determines that the call is a "featured" call requiring special processing by a service processor 50, then the SD 40 searches the SP Table 60 stored in its database to generate a list identifying one or more service processors 50 (including any backup or secondary service processors) that are capable of processing the call for the particular network services subscribed to by the subscriber (step 203). The SP Table 60, which is illustrated in FIG. 6 and described further below, contains information on service processor point codes, routing type (e.g., round robin routing, primary/mate routing, primary only, and primary and multiple backups), and availability status of service processors 50 in the network 10 that are capable of processing the call.

Based upon the information stored in the SP Table 60, the SD 40 also determines whether round-robin routing should be applied to distribute the load (e.g., load share) between at least two service processors identified by the SD 40 as being capable of processing the call for the particular network services subscribed to by the subscriber (step 204). If round-robin routing is desired, then the SD 40 identifies the next service processor 50 in the list of service processors identified by the SD 40 as being capable of processing the call that is due to be utilized in terms of load sharing by incrementing a pointer or other identifier in the list to that service processor 50 (step 205).

Figure 5:
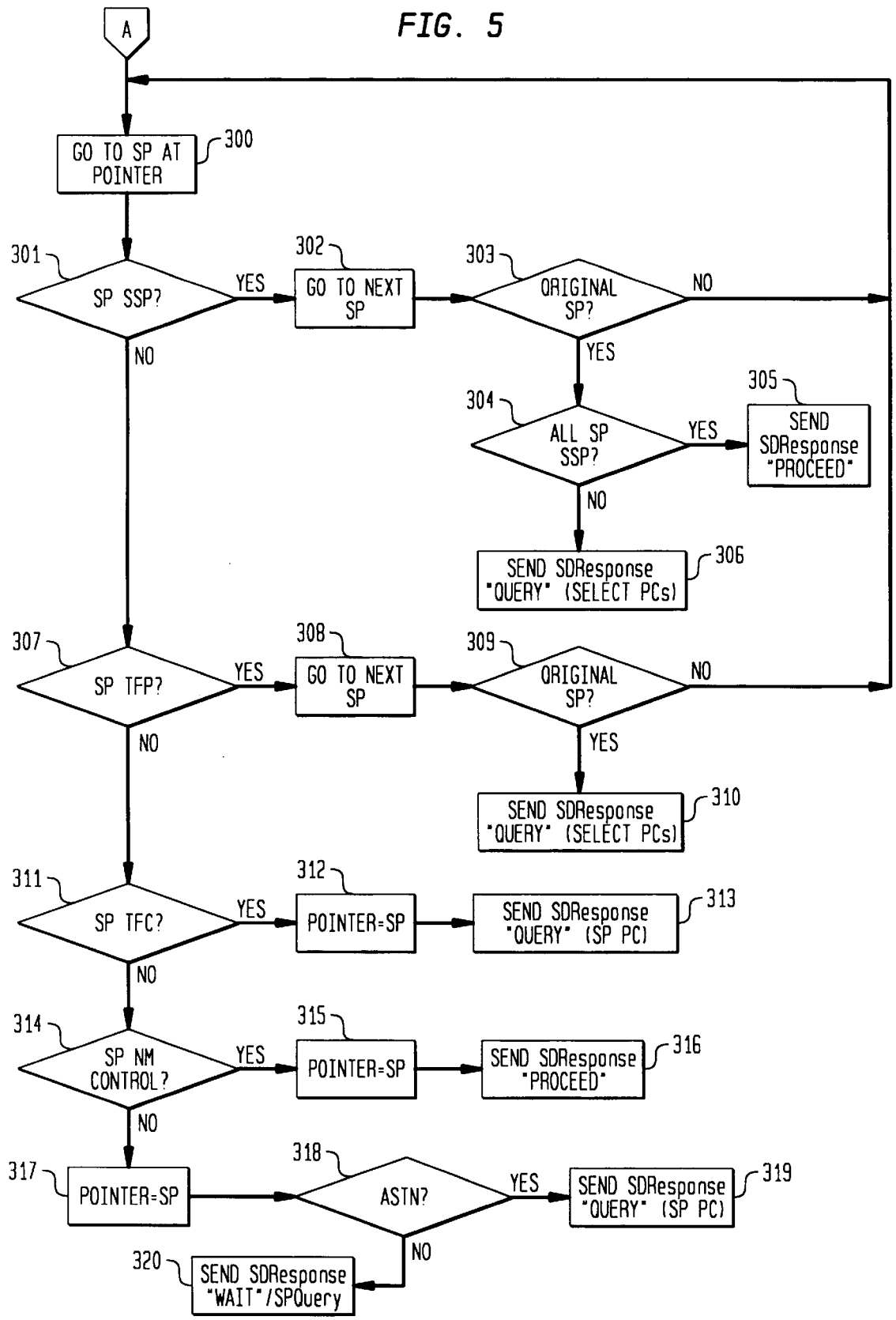
FIG. 5 is a flow chart illustrating the method in which the SD determines that a query instruction response is required in accordance with the present invention.

FIG. 5 is a flow chart illustrating the method in accordance with the present invention in which the SD 40 determines that a "Query" instruction is required as part of the SDResponse message to the switch 30. As discussed above, the "Query" instruction portion of the SDResponse message instructs the switch 30 to query a service processor 50 using the Service Processor (SP) SS7 network address and information provided by the SD 40 in the SDResponse message.

In step 300 illustrated in FIG. 5, the SD 40 looks at one particular service processor 50 in the list of service processors previously identified by the SD 40 as being capable of processing the call. This particular service processor 50 is preferably the service processor 50 in which the pointer is incremented to (hereinafter referred to as the "primary" service processor).

In step 301, the SD 40 determines whether the primary service processor 50 is SS7 Signalling Connection Control Part (SCCP) Subsystem Prohibited (SSP) (e.g., a failure has occurred within the service processor 50). Typically, upon a failure condition in the service processor, the failed service processor automatically signals the SD 40 of the SSP condition for that failed service processor. If the primary service processor is not in an SSP condition, then the SD 40 proceeds to step 307 discussed below.

Alternatively, if the primary service processor 50 is in an SSP condition in step 301, then SD 40 increments the pointer in the list of service processors identified by the SD 40 as being capable of processing the call to the next service processor in the list (step 302). The SD 40 then determines whether this "next" service processor is the same service processor as the primary service processor originally identified as being in the SSP condition (step 303). If not, then the SD 40 repeats steps 300 and 301 to ascertain whether this "next" service processor is also in the SSP condition. The SD 40 will continue to increment to the "next" service processor in the list until the SD 40 has checked all of the service processors in the list to ascertain their respective SSP conditions (step 303). Once all of the service processors in the list have been considered and the pointer is incremented back to the original, primary service processor in step 303, then the SD 40 proceeds to step 304.

If the SD 40 determines in step 304 that all of the service processors identified in the list of service processors capable of processing the call are in the SSP condition, then the SD 40 creates and transmits to the switch 30 an SDResponse "Proceed" message instructing the switch 30 to proceed with call processing using the information in the call registers of the switch 30 to route the call within the network 10 (step 305). Alternatively, if all of the service processors identified in the list are not in the SSP condition (step 304), then the SD 40 creates and transmits to the switch 30 an SDResponse "Query" message instructing the switch 30 to query a service processor 50 using the SP SS7 network address and information associated with the service processor 50 provided by the SD 40 in the SDResponse message (step 306). The SDResponse message transmitted in step 306 may also contain the SP SS7 network address and information associated with any other backup or secondary service processors identified in the list that were identified in steps 300–303 as not being in an SSP condition.

Referring now to step 307 illustrated in FIG. 5, if the SD 40 determines in step 301 that the primary service processor 50 identified in the list of service processors capable of processing the call is not in an SSP condition, then the SD 40 determines in step 307 whether that non-SSP, primary service processor is in a TFP condition (i.e., MTP route inaccessible). If the SD 40 determines that the non-SSP service processor 50 is in a TFP condition, then the SD 40 increments the pointer in the list of service processors identified by the SD 40 as being capable of processing the call to the "next" service processor in the list (step 308). The SD 40 then determines whether this "next" service processor is the same service processor as the "original" primary service processor identified as being in the TFP condition (step 309). If the answer in step 309 is in the affirmative, then the SD 40 proceeds to step 310 discussed below.

Alternatively, if the answer in step 309 is in the negative, then the SD 40 repeats steps 300, 301 and 307 to ascertain whether this "next" service processor is also in the SSP and TFP conditions. The SD 40 will continue to increment to the "next" service processor in the list until the SD 40 identifies a service processor in the list that is not in the TFP condition (step 307) or until the SD 40 has checked all of the service processors in the list (steps 303, 309).

If the SD 40 determines that at least one of the service processors identified in the list of service processors capable of processing the call are in the TFP condition, then the SD 40 creates and transmits to the switch 30 an SDResponse "Query" message instructing the switch 30 to query the service processor 50 using the SP address and information associated with the service processor(s) 50 in the TFP condition provided by the SD 40 in the SDResponse message (step 310). The SDResponse message transmitted in step 310 may also contain the SP SS7 network address and information associated with any other backup or secondary service processors identified in the list that were identified as not being in an SSP condition.

Referring now to step 311 illustrated in FIG. 5, if any of the service processors 50 identified in the list of service processors capable of processing the call are not in the SSP or TFP conditions, then the SD 40 determines whether that non-SSP/TFP service processor is in a TFC condition (i.e., MTP route congestion). If the answer in step 311 is in the negative, then the SD 40 proceeds to step 314 discussed below.

Alternatively, if the SD 40 determines in step 311 that the non-SSP/TFP service processor is in a TFC condition, then the SD 40 sets the pointer in the list of service processors identified as being capable of processing the call to that particular non-SSP/TFP service processor 50 (step 312). The SD 40 then creates and transmits to the switch 30 an SDResponse "Query" message instructing the switch 30 to query that non-SSP/TFP service processor 50 using the SP address and information associated with the service processor 50 provided by the SD 40 in the SDResponse message (step 313).

Referring now to step 314 illustrated in FIG. 5, if any of the service processors 50 identified in the list of service processors capable of processing the call are not in the SSP, TFP or TFC conditions, then the SD 40 determines whether that non-SSP/TFP/TFC service processor is in a NM Control condition (e.g., an application overload control (AOC) condition). If that non-SSP/TFP/TFC service processor is in the NM Control condition, then the SD 40 sets the pointer in the list of service processors identified as being capable of processing the call to that particular non-SSP/TFP/TFC service processor 50 (step 315). The SD 40 then creates and transmits to the switch 30 an SDResponse "Proceed" message instructing the switch 30 to proceed with call processing using the information in the call registers of the switch 30 to route the call within the network 10 (step 316).

Alternatively, if the SD 40 determines in step 314 that the non-SSP/TFP/TFC service processor is not in the NM Control condition, then the SD 40 sets the pointer in the list of service processors identified as being capable of processing the call to that particular non-SSP/TFP/TFC/NM Control service processor 50 (step 317). SD 40 next determines if the ASTN indicator received at SD 40 from switch 30 used ASTN to query SD 40 (step 318). If the ASTN indicator indicates the affirmative, the SD 40 creates and transmits to the switch 30 an SDResponse "Query" message instructing the switch 30 to query that non-SSP/TFP/NM Control service processor 50 using the SP address and information associated with the service processor 50 provided by the SD 40 in the SDResponse message (step 319).

Alternatively, if the ASTN indicator indicates that ASTN was not used (step 318), the SD 40 then creates and transmits to the switch 30 an SDResponse message instructing the switch 30 to wait for an SPResponse message from the non-SSP/TFP/TFC/NM Control service processor 50 (step 320). In addition, in step 320, the SD 40 also creates and transmits an SPQuery message to the non-SSP/TFP/TFC/NM Control service processor 50 so that the service processor 50 may control and process the call in accordance with the particular service provider-defined processing associated with that network service application. The service processor 50 receives the SPQuery from the SD 40, processes the call in accordance with the SPQuery message and thereafter instructs the switch 30 accordingly.

Referring now to FIG. 6, an SP Table 60 is illustrated, which table is preferably stored within a database of the SD 40 and utilized by the SD 40 to determine the SS7 network routing information associated with one or more service processors 50 capable of processing the call in accordance with the present invention. The SP Table 60 illustrated in FIG. 6 preferably comprises three columns. The first column of the SP Table 60 contains the routing method to be used to reach the desired service processor(s) 50 (e.g., primary/mate, primary/multiple backups, primary only, and round-robin routing).

The term "primary only" is used herein to refer to a routing method where only one service processor (the "primary" service processor) is to be utilized to process the call. If the SS7 network address for the primary service processor is not available, then no SPQuery may be transmitted for the call.

The term "primary/mate" is used herein to refer to a routing method where two SP SS7 addresses are possible, a primary service processor and one backup or secondary service processor (the "mate"). If the primary service processor is unavailable due to MTP route unavailability or SSP, the backup service processor is utilized to process the call.

Alternatively, the term "primary/multiple backups" is used herein to refer to a routing method where more than one backup or secondary service processor are available in the event that the primary service processor is unavailable. Thus, if the primary service processor is unavailable due to MTP route unavailability or SSP, the first backup service processor is utilized to process the call. However, if the first backup service processor is also unavailable, the second backup service processor is used. This continues until there are no backup SP SS7 addresses to route the SPQuery message.

Finally, the term "round-robin" is used herein to refer to a routing method where two or more service processors may be utilized to process the call. The service processor used to route the SDQuery message is load shared through all the available service processors. For example, the first SPQuery message is transmitted to the first available SP SS7 address associated with the first service processor and the next call requiring an SPQuery message for this type of service processor is transmitted to the second available SP SS7 address associated with the second service processor, etc. In this manner, the load on each available service processor may be equalized or otherwise proportionately distributed between two or more service processors capable of processing the call.

The second column of the SP Table 60 contains the SP SS7 network address (e.g., the point code and subsystem number) for the primary service processor 50 (and any mating, multiple, round-robin, backup or secondary service processors) capable of processing the call for the particular service(s) subscribed to by the subscriber. The third column of the SP Table 60 contains the status of the point code (e.g., available (MTP route accessible), MTP route inaccessible (TFP), subsystem prohibited (SSP), application overload control (AOC), etc.). The term "AOC" is used herein to refer to the reception of an application overload control (NM Control) message from the service processor indicating that the application is in overload and that a certain portion of SPQuery messages should be throttled. The message used to transmit the above-mentioned status information to the SD 40 is preferably an Automatic Call Gap (ACG) message.

In the SP Table 60 illustrated in FIG. 6, various SP SS7 network addresses may be utilized to reach a service processor 50 capable of processing the call. The status of the SP SS7 address is determined dynamically based on its SS7 network routing status. The routing method determines the method of transmitting the SPQuery message to the SP SS7 addresses associated with the service processors capable of processing the call for the particular service.

Figure 7:
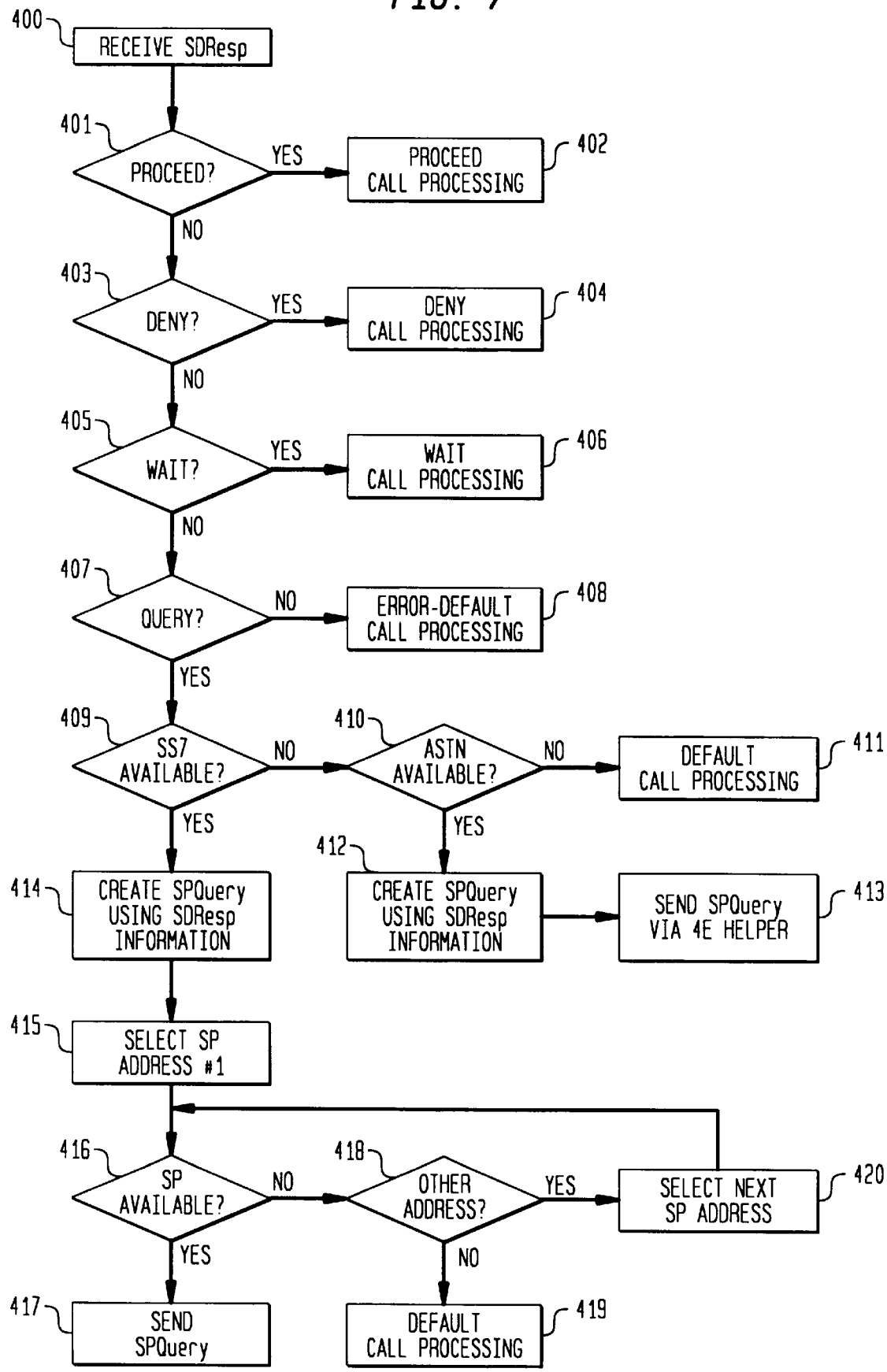
FIG. 7 is a flow chart illustrating the method in which the network switch processes a response received from the SD in accordance with the present invention.

Referring now to FIG. 7, a flow chart is shown illustrating the method in which the switch 30 processes the SDResponse received from the SD 40 in accordance with the present invention. When the switch 30 receives the SDResponse message from the SD 40 (step 400), the switch 30 determines whether the SDResponse message contains a "Proceed" instruction to proceed with call processing using the information in the call registers of the switch 30 to route the call (step 401). If so, then the switch 30 follows the "Proceed" instruction to process the call using the information in the call registers of the switch 30 to route the call (step 402).

If the SDResponse message contains no instruction to "Proceed" in step 401, then the switch 30 determines in step 403 whether the SDResponse message contains a "Deny" instruction instructing the switch 30 to not route the call within the network 10 so that the call resources for the call may be released. If so, then the switch 30 follows the "Deny" instruction to deny the call (step 404).

If the SDResponse message contains no instruction to "Deny" in step 403, then the switch 30 determines in step 405 whether the SDResponse message contains a "Wait" instruction instructing the switch 30 to wait for an SPResponse message from a service processor 50 before routing the call based upon instructions contained within the SPResponse message. If so, then the switch 30 follows the "Wait" instruction and awaits receipt of the SPResponse message from the service processor 50 (step 406).

If the SDResponse message contains no instruction to "Wait" in step 405, then the switch 30 determines in step 407 whether the SDResponse message contains a "Query" instruction instructing the switch 30 to query a service processor 50 using the SP SS7 network address and information provided by the SD 40 in the SDResponse message. If the SDResponse message does not contain a "Query" instruction in step 407, then the switch 30 detects an error condition and attempts to process the call using the default information in the call registers of the switch 30 to route the call (step 408).

However, if the SDResponse message includes a "Query" instruction in step 407, then the switch 30 determines in step 409 whether a SS7 data link is available for transmitting a signal to the desired service processor 50. If there is no available SS7 data link to the desired service processor 50, then the switch determines in step 410 whether there is an available ASTN interface to the desired service processor 50 (e.g., whether a helper switch 35 could be utilized to signal the desired service processor 50). If not, then the switch 30 attempts to process the call using the default information in the call registers of the switch 30 to route the call (step 411).

However, if an ASTN interface is available in step 410, then the switch creates an SPQuery message using the SP SS7 address and information provided in the SPResponse message (step 412) and transmits the SPQuery message to the desired service processor 50 via the helper switch 35 over the ASTN interface (step 413).

Similarly, if the switch determines in step 409 that a SS7 data link is available for transmitting a signal to a desired service processor 50, then the switch 30 creates an SPQuery message using the SP SS7 address and information provided in the SPResponse message (step 414) and selects the SP SS7 network address corresponding to the primary service processor identified in the SDResponse message (step 415).

In step 416 illustrated in FIG. 7, the switch 30 then determines whether the primary service processor is available (e.g., not MTP route inaccessible, MTP route congested or SSP). If not, then the switch 30 checks the SDResponse message to ascertain whether any other SP SS7 network addresses are identified for service processors capable of processing the call (step 418). If the SDResponse message identifies additional service processors, then the switch 30 selects the next SP address (step 420) and repeats steps 416, 418 and 420 to determine whether any of these additional service processors are available. If the SDResponse message does not contain any additional SP SS7 addresses associated with additional service processors (step 418), or if none of these additional service processors are available (step 416), then the switch 30 attempts to process the call using the default information in the call registers of the switch 30 to route the call (step 419).

If the switch 30 determines in step 416 that the primary service processor (or any additional service processors identified in step 418) is available, then the switch 30 transmits the SPQuery message to the available service processor 50 (step 417). Thus, when the switch 30 receives the SDResponse message including a "Query" instruction from the SD 40, the switch 30 will create and attempt to route an SPQuery message to the SP SS7 network addresses provided in the SDResponse message. The switch 30 uses the TCAP information provided in the SDResponse message to create the SPQuery message.

Although an illustrative preferred embodiment has been described herein in detail, it should be noted and will be appreciated by those skilled in the art that numerous variations may be made within the scope of this invention without departing from the principle of this invention and without sacrificing its chief advantages. For instance, it is understood that the present invention could be utilized in any telecommunications network that utilizes distributed applications for completing calls. Similarly, the present invention is applicable to a wide variety of computing environments where distributed client-server architectures are present. It is also understood that, while the present invention has been described above with respect to "SS7" messaging over a signalling system, other types of signalling systems may be utilized to interconnect and communicate signalling messages between the various components of the telecommunications network. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method of processing a call in a telecommunications network comprising a signalling system interconnecting a switch, a segmentation directory and at least one service processor for processing a call associated with a particular service or feature provided by the telecommunications network, the method comprising the steps of:

receiving the call and information associated with the call at the switch;

transmitting a first query message from the switch to the segmentation directory;

identifying whether the call requires processing by a service processor, and if so, identifying a service processor capable of processing the call;

determining whether a second query message may be transmitted from the segmentation directory to the identified service processor over the signalling system; and if the second query message cannot be transmitted from the segmentation directory to the identified service processor, transmitting a response message from the segmentation directory to the switch instructing the switch to transmit a third query message over the signalling system to the identified service processor.

2. The method according to claim 1, further comprising the steps of:

creating the third query message to the identified service processor based upon information contained within the response message; and transmitting the third query message to the identified service processor over the signalling system.

3. The method according to claim 2, wherein the third query message is transmitted directly from the switch to the identified service processor over the signalling system.

4. The method according to claim 2, wherein the third query message is transmitted indirectly from the switch to the identified service processor over an Alternate Signalling Transport Network (ASTN) interface of the switch.

5. The method according to claim 1, further comprising the step of storing in a database a table listing one or more service processors capable of processing the particular service or feature associated with the call.

6. The method according to claim 5, wherein the step of identifying a service processor capable of processing the call comprises the step of selecting the service processor from the table based upon the particular service or feature associated with the call.

7. The method according to claim 6, further comprising the steps of:

selecting from the table one or more secondary service processors capable of processing the call based upon the particular service or feature associated with the call;

providing the signalling system address associated with the selected secondary service processors to the switch in the response message; and transmitting the third query message to one of the selected secondary service processors when the identified service processor is unavailable.

8. The method according to claim 7, further comprising the step of processing the call using information contained in one or more call registers of the switch to route the call within the network when the identified service processor and secondary service processors are unavailable.

9. The method according to claim 8, wherein the response message includes an instruction to the switch to process the call using information contained in one or more call registers of the switch to route the call within the network when the identified service processor and secondary service processors are unavailable.

10. The method according to claim 9, wherein a service processor is unavailable when the signalling system route to the service processor is route inaccessible or route congested.

11. The method according to claim 9, wherein a service processor is unavailable when the service processor is in a subsystem prohibited or overloaded condition.

12. The method according to claim 5, wherein the step of determining whether a second query message may be transmitted from the segmentation directory to the identified service processor over the signalling system comprises the steps:

storing in the table the availability status of the identified service processor and a signalling system route comprised of at least one data link connecting the segmentation directory to the identified service processor; and searching the table to determine the availability status of the identified service processor and signalling system route.

13. The method according to claim 5, further comprising the steps of:

storing in the table a signalling system address associated with each of the service processors listed in the table as being capable of processing the particular service or feature associated with the call;

searching the table for the signalling system address associated with the identified service processor; and providing the signalling system address associated with the identified service processor to the switch in the response message.

14. The method according to claim 1, wherein the first query message is transmitted directly from the switch to the segmentation directory over the signalling system.

15. The method according to claim 1, wherein the first query message is transmitted indirectly from the switch to the segmentation directory over an Alternate Signalling Transport Network (ASTN) interface of the switch.

16. The method according to claim 1, wherein the response message is transmitted directly from the segmentation directory to the switch over the signalling system.

17. The method according to claim 1, further comprising the steps of indicating in the first query message that the switch is utilizing an Alternate Signalling Transport Network (ASTN) interface of the switch and transmitted the response message indirectly from the segmentation directory to the switch over the switch's ASTN interface.

18. A system for processing a call in a telecommunications network, comprising:
   a switch for receiving the call and information associated with the call at the switch;
   one or more service processors capable of processing a call associated with a particular service or feature provided by the telecommunications network;
   a segmentation directory for directing the call to one of the service processors; and
   a signalling system interconnecting the switch, service processors and segmentation directory,
   wherein, in response to a first query message transmitted from the switch to the segmentation directory over the signalling system, the segmentation directory is adapted to identify whether the call requires processing by one of the service processors, and if so, to identify a service processor capable of processing the call, and, if a communication path of the signalling system is unavailable between the segmentation directory and the identified service processor, the segmentation directory is adapted to transmit a response message to the switch instructing the switch to transmit a second query message over the signalling system to the identified service processor.

19. The system according to claim 18, wherein the switch is adapted to create the second query message to the identified service processor based upon information contained within the response message and is adapted to transmit the second query message to the identified service processor over the signalling system.

20. The system according to claim 18, further comprising a database associated with the segmentation directory, the database adapted to store a table listing one or more service processors capable of processing the particular service or feature associated with the call.

21. The system according to claim 20, wherein the segmentation directory identifies the service processor capable of processing the call by selecting the service processor from the table based upon the particular service or feature associated with the call.

22. The system according to claim 21, wherein the segmentation directory is adapted to select from the table one or more secondary service processors capable of processing the call based upon the particular service or feature associated with the call and provide the signalling system address associated with the selected secondary service processors to the switch in the response message so that the switch may transmit the second query message to one of the selected secondary service processors when the identified service processor is unavailable.

23. The system according to claim 22, wherein the switch comprises at least one call register so that the switch may process the call using information contained in the call registers to route the call within the network when the identified service processor and secondary service processors are unavailable.

24. The system according to claim 23, wherein the response message includes an instruction to the switch to process the call using information contained in the call registers of the switch to route the call within the network when the identified service processor and secondary service processors are unavailable.

25. The system according to claim 24, wherein a service processor is unavailable when the signalling system route to the service processor is route inaccessible or route congested.

26. The system according to claim 24, wherein a service processor is unavailable when the service processor is in a subsystem prohibited or overloaded condition.

27. The system according to claim 20, wherein the table further comprises the availability status of the identified service processor and a signalling system route comprised of at least one data link connecting the segmentation directory to the identified service processor in order to ascertain whether the communication path is unavailable between the segmentation directory and the identified service processor.

28. The system according to claim 20, wherein the table further comprises a signalling system address associated with each service processor listed in the table as being capable of processing the particular service or feature associated with the call so that the signalling system address associated with the identified service processor may be transmitted to the switch in the response message.

29. The system according to claim 18, further comprising a helper switch in communication with an Alternate Signalling Transport Network (ASTN) interface of the switch in order to assist the switch in communication with the segmentation directory and the service processor.

* * * * *